US012625010B2

(12) United States Patent
Fortunato et al.

(10) Patent No.: US 12,625,010 B2
(45) Date of Patent: May 12, 2026

(54) COUPLING ADAPTER FOR A THERMOMETER

(71) Applicant: Endress+Hauser Wetzer GmbH+Co. KG, Nesselwang (DE)

(72) Inventors: Gianluca Fortunato, Milan (IT); Michele Pietroni, San Donato (IT); Davide Eralti, Vedano Al Lambro (IT); Davide Tagliabue, Paderno Dugnano (IT); Andrea Micieli, Vignate (IT); Markus Mornhinweg, Dießen (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 697 days.

(21) Appl. No.: 18/054,319

(22) Filed: Nov. 10, 2022

(65) Prior Publication Data

US 2023/0147830 A1 May 11, 2023

(30) Foreign Application Priority Data

Nov. 10, 2021 (EP) ..................................... 21207421

(51) Int. Cl.
| | |
|---|---|
| *G01K 1/14* | (2021.01) |
| *G01K 1/08* | (2021.01) |
| *G01K 1/16* | (2006.01) |

(52) U.S. Cl.
CPC ................. *G01K 1/14* (2013.01); *G01K 1/08* (2013.01); *G01K 1/16* (2013.01)

(58) Field of Classification Search
CPC .............. G01K 1/14; G01K 1/08; G01K 1/16
USPC ................................................. 374/208, 148
See application file for complete search history.

(56) References Cited

U.S. PATENT DOCUMENTS

| | | | |
|---|---|---|---|
| 9,091,599 B2 * | 7/2015 | Lukach, Jr. .............. | G01K 1/16 |
| 2019/0293241 A1 | 9/2019 | Rud et al. | |
| 2021/0270679 A1 | 9/2021 | Peuker et al. | |

(Continued)

FOREIGN PATENT DOCUMENTS

| | | |
|---|---|---|
| CN | 203432706 U1 | 2/2014 |
| DE | 2533632 A1 | 2/1977 |
| DE | 4427181 A1 | 2/1996 |

(Continued)

OTHER PUBLICATIONS

Translation of DE2533632A1.*

*Primary Examiner* — Mirellys Jagan
(74) *Attorney, Agent, or Firm* — Christopher R. Powers; Endress+Hauser (USA) Holding, Inc.

(57) ABSTRACT

The present disclosure relates to a coupling adapter for a measuring insert for determining and/or monitoring a temperature of a medium including a temperature sensor, which measuring insert can be introduced into a protective tube for accommodating the measuring insert. The coupling adapter includes a base body, including a bore with a diameter adapted to an outer diameter of the measuring insert, and a coupling element, which is arranged on an outer surface of the base body, which coupling element is embodied and/or dimensioned so as to serve for fixing the measuring insert inside the protective tube in a state in which the measuring insert is introduced into the protective tube. The present disclosure further includes an apparatus for determining and/or monitoring the temperature of a medium comprising such coupling adapter.

11 Claims, 4 Drawing Sheets

(56)     References Cited

U.S. PATENT DOCUMENTS

| | | | |
|---|---|---|---|
| 2021/0325219 A1 | 10/2021 | Strom et al. | |
| 2023/0143794 A1 * | 5/2023 | Fortunato ................ | G01K 1/16 |
| | | | 374/158 |

FOREIGN PATENT DOCUMENTS

| | | | | | |
|---|---|---|---|---|---|
| DE | 29621433 | U1 | 4/1998 | | |
| DE | 102013114140 | A1 | 6/2015 | | |
| DE | 102014101968 | A1 | 8/2015 | | |
| DE | 102017100267 | A1 | 7/2018 | | |
| DE | 102018111167 | A1 | 11/2019 | | |
| EP | 1807681 | A2 | 7/2007 | | |
| EP | 2450682 | A2 | 5/2012 | | |
| EP | 2748571 | A1 | 7/2014 | | |
| EP | 3184979 | A1 | 6/2017 | | |
| EP | 3264059 | A1 | 1/2018 | | |
| EP | 3112830 | B1 * | 8/2018 | .............. | G01K 1/14 |
| JP | 2009133819 | A | 6/2009 | | |
| JP | 2015152336 | A * | 8/2015 | | |
| WO | 2014158393 | A1 | 10/2014 | | |
| WO | 2016169922 | A1 | 10/2016 | | |

* cited by examiner

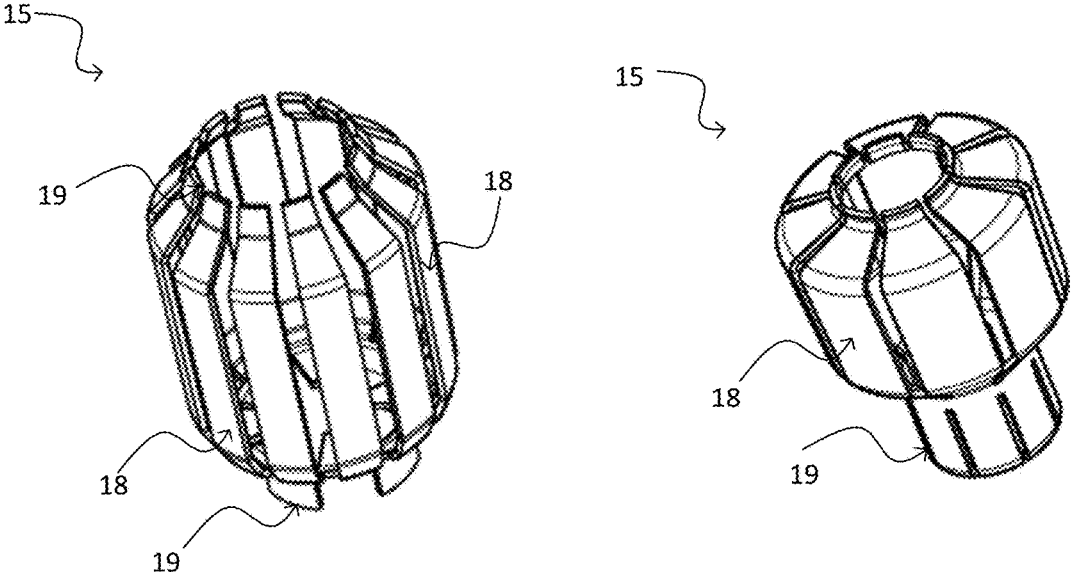
Fig. 4a
Fig. 4b
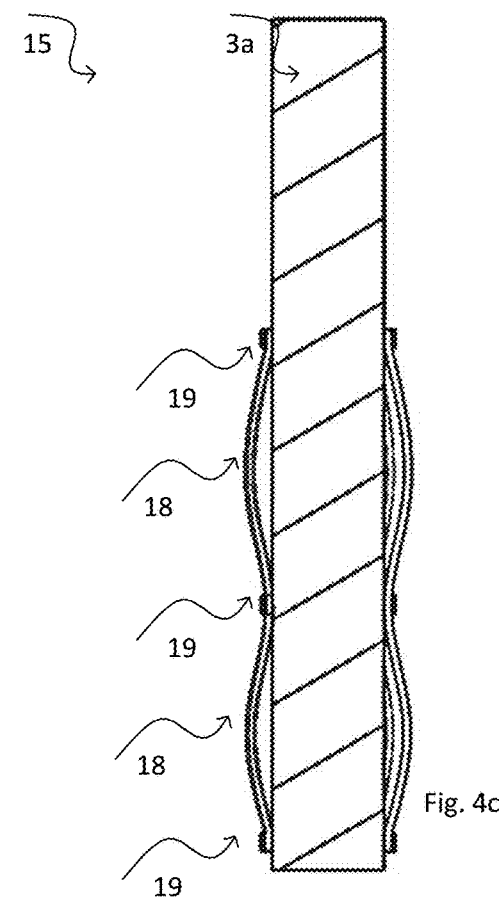
Fig. 4c

COUPLING ADAPTER FOR A THERMOMETER

The present application is related to and claims the priority benefit of European Patent Application No. 21207421.5, filed on Nov. 10, 2021, the entire contents of which are incorporated herein by reference.

TECHNICAL FIELD

The present disclosure generally relates to coupling adapters for measuring inserts for determining and/or monitoring a temperature of a medium in a vessel or pipe. The present disclosure further relates to apparatuses for determining and/or monitoring a temperature of a medium in a vessel or pipe comprising such a coupling adapter.

BACKGROUND

Thermometers have become known from the state of the art in a wide variety of designs. For example, there are thermometers that use the expansion of a liquid, a gas or a solid with a known coefficient of expansion to measure the temperature. Other thermometers associate the electrical conductivity of a material with the temperature, for example, when resistance elements or thermocouples are used. Pyrometers, on the other hand, use the heat radiation of a substance to determine its temperature. The respective underlying measuring principles have each been described in a large number of publications.

A temperature sensor in the form of a resistive element or a so-called thin-film sensor, in particular a resistance temperature detector (RTD), for example, uses a sensor element provided with connecting wires and applied to a carrier substrate, whereby the rear side of the carrier substrate is usually metallically coated. The sensor elements used are so-called resistor elements, which are given, for example, by platinum elements, which are also commercially available as PT10, PT100 and PT1000 elements.

In case thermocouples, the temperature is determined by means of a thermoelectric voltage occurring between the thermocouple wires connected at one end and consisting of different materials. For temperature measurement, commonly thermocouples according to DIN standard IES584, for example, thermocouples of type K, J, N, S, R, B, T or E, are used as temperature sensors. But other material pairs, especially those with a measurable Seebeck effect, are also possible.

In certain applications, temperature sensors are arranged in a measuring insert, which in turn is brought into contact with the medium via a protective tube in the form of a thermowell, the protective tube being in physical contact with the fluid.

On the one hand, such thermowells are subject to high loads, in particular when they are exposed to a flowing medium which causes different mechanical forces acting on the protective tube, e.g., shear forces or forces induced by coherent vortex shedding which can result in vortex induced vibrations (VIV). Vortex shedding in fluid dynamics is known as "Karman vortex street" and refers to a repeating pattern of swirling vortices in alternating directions caused by the unsteady separation of flow of a medium around a body, causing the body to vibrate. The closer the frequency of the vibrations is to the natural frequency of the body around which the medium flows, the more the body vibrates.

Moreover, the measuring accuracy of a thermometer is highly dependent on thermal couplings between the respective medium, the process environment and/or the thermometer. In this manner, the prevailing heat flows play a decisive role. A reliable determination of the temperature requires that the thermometer and the medium are in thermal equilibrium for at least a period of time required to determine the temperature. At least for this period of time the temperature of the thermometer and that of the medium, therefore, should be ideally essentially the same. The reaction of a thermometer to a change in temperature, i.e., the so-called response time of the thermometer, plays a decisive role here, especially if the temperature of the medium changes substantially continuously. In that sense, another problem frequently associated with thermometers comprising a thermowell is related to the response time.

Many different solutions have been presented to reduce the response time and to increase the measuring accuracy of thermometers comprising thermowells. For example, walls of the protective tube are made as small as possible. Another approach relates to improvements of contacts between the measuring insert and thermowell. In this context DE102013114140A1 or DE102014101968A1, e.g., describe the use of additional spring elements to improve the contact between the protection tube and the measuring insert. DE102018111167A1 suggests a coupling unit positioned between the measuring insert and thermowell. WO2014/158393A1 discloses a solid insert configured to removably support the temperature probe within the thermowell and to provide a thermal contact between thermowell and probe.

SUMMARY

Based on the known solutions, it is an object of the present disclosure to provide a measuring insert for use with a thermowell with improved performance. This object is achieved by the measuring inserts and thermometers according to the present disclosure.

Regarding the coupling adapter, the object underlying the present disclosure is achieved by a coupling adapter for a measuring insert for determining and/or monitoring a temperature of a medium including a temperature sensor, which measuring insert can be introduced into a protective tube for accommodating the measuring insert. The protective tube at least partially protrudes into an inner volume of the vessel or pipe, and the measuring insert comprises an elongated tube, and a temperature sensor arranged inside an end region of the tube. The measuring insert comprises an elongated tube and a temperature sensor arranged inside an end region of the measuring insert. The elongated tube, e.g., can further comprise connecting wires for establishing an electrical connection with the temperature sensor. Moreover, the elongated tube may be filled with a filling material.

According to the present disclosure, the coupling adapter comprises a base body, having a bore with a diameter adapted to an outer diameter of the measuring insert, and a coupling element, which is arranged on an outer surface of the base body, which coupling element is embodied and/or dimensioned so as to serve for fixing the measuring insert inside the protective tube in a state in which the measuring insert is introduced into the protective tube.

The coupling adapter is preferably arranged in an end region of the measuring insert or elongated tube, in which the temperature sensor is located. The coupling element thus serves for increased mechanical stability of the measuring insert when the measuring insert is introduced into the protective tube together with the coupling adapter. It further serves for reduced sensitivity against mechanical vibrations of the thermometer. By means of the coupling adapter, a gap between an outer wall of the measuring insert and an inner wall of the protective tube is reduced.

In at least one embodiment, the base body and/or the coupling element is/are at least partially composed of a thermally conductive material. The gap between the walls of the measuring insert and protective tube without a coupling adapter is usually filled by air which is a poor heat conductor. The coupling adapter at least partially reduces or minimizes this gap. By providing a coupling adapter at least partially being composed by a metallic material, an increased response time and improved heat transfer can be achieved leading to enhanced measurement accuracy.

The coupling adapter may further be provided with certain dimensions or geometries which are chosen so as to improve heat transfer, mechanical stability and/or reducing vibrations.

In at least one embodiment, the coupling element of the coupling adapter comprises a first and a second component, the first component being at least partially rigid and the second component at least partially being elastic. Additionally, the two components can further have different thermal conductivities and/or thermal expansion coefficients. The rigid component serves for mechanical stabilization and the second component improves the fitting of the measuring insert inside the protective tube. Providing a coupling element of the coupling adapter made of two components thus improves the fitting performance of the measuring insert inside the protective tube.

In at least one embodiment, the coupling element comprises at least one at least partially elastic and/or deformable element. The elastic and/or deformable element can be the second component of the previously described embodiment or any other element or component of the coupling element. In this regard, it is of advantage if the at least one at least partially elastic and/or deformable element is a, in particular metallic, mesh or a metallic foam. It is further of advantage if the at least one at least partially elastic and/or deformable element is a, in particular metallic, spring element.

The coupling element can also comprise a, in particular metallic, mesh or a metallic foam and a, in particular metallic, spring element. With respect to the spring element, it is of advantage if the spring element is embodied such that a spring travel of the spring element is perpendicular to a longitudinal axis of the measuring insert. It is further of advantage if the spring element comprises a plurality of outward curved bars and at least one ring-shaped connection element, to which the plurality of bars is connected, in particular wherein the bars are evenly distributed around the circumference of the connection element.

In further embodiments, the coupling element further comprises a filling material, for example, a powder at least partially comprising carbon, in particular a graphite powder, or a paste. The powder or the paste might preferably be added to the, in particular metallic, mesh or metallic foam, or to the spring element. The powder or paste serves to fill remaining gaps in an area of the coupling element. If the coupling element comprises at least one at least partially elastic and/or deformable element, it becomes possible to fill gaps while maintaining elasticity.

The coupling element may be detachably or fixedly connected to the base body of the coupling adapter. For example, the coupling element may be fastened to the base body by means of a force-fit and/or form-fit connection. For instance, the coupling element can be fastened to the base body by means of a braze or a solder connection.

However, it is also of advantage if the coupling element and/or base body comprise fastening means for fastening the coupling element to the base body and/or the base body to the measuring insert. For example, the coupling element may comprise at least one ring element having an inner diameter corresponding to an outer diameter of the base body. The base body in turn may comprise at least one section parallel to a longitudinal axis of the base body with reduced diameter in which the coupling element may be arranged. The base body, for example, has at least one shoulder in an outer wall parallel to its longitudinal axis, which shoulder serves to fasten the coupling element on the base body. The base body may further comprise fastening means for fixedly or detachably fastening the base body to the measuring insert. In at least one embodiment, the base body has a cylindrical shape with an internal bore having a bore diameter corresponding to an outer diameter of the measuring insert.

It shall be noted that also existing measuring inserts can be retrofitted with a coupling adapter as described above, e.g., by fastening such coupling adapter to the measuring insert. It shall be further noted that the embodiments described can be combined with each other arbitrarily.

The object underlying the present disclosure is also achieved by means of an apparatus for determining and/or monitoring a temperature of a medium in a vessel or pipe comprising a coupling adapter according to the present disclosure.

The thermometer may further comprise a measuring transducer which may be arranged with the measuring insert, or separately from the measuring insert. The transducer preferably serves for processing at least the temperature of the medium determined by the measuring insert.

BRIEF DESCRIPTION OF THE DRAWINGS

In the following, the present disclosure will be explained in greater detail based on the drawings presented, which include:

FIGS. 4a-4c show several preferred embodiments of a spring element according to the present disclosure.

In the figures, identical elements are always provided with the same reference sign.

DETAILED DESCRIPTION

Figure 1:
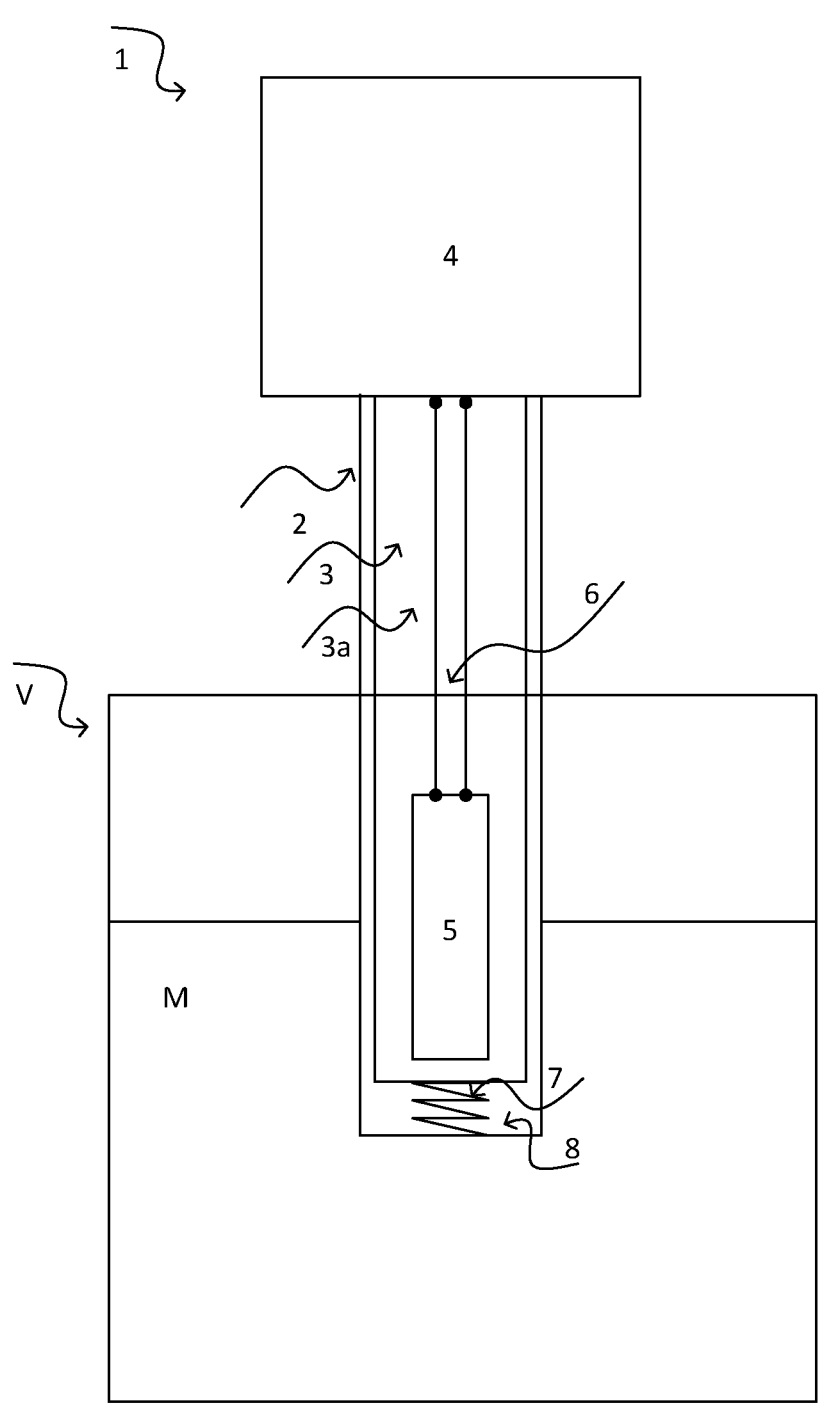
FIG. 1 shows a thermometer comprising a measuring insert and a protective tube according to the state of the art.

FIG. 1 shows a schematic diagram of a state of the art thermometer 1 for determining the temperature T of a medium M in a vessel V, the thermometer 1 comprising a protective tube 2, a measuring insert 3 and electronics 4. The measuring insert 3 is inserted into the protective tube 2 and comprises an elongated tube 3a in which temperature sensor 5, here in the form of a resistive element, is arranged. In certain embodiments, the temperature sensor, e.g., comprises a thermocouple of a resistive element. The temperature sensor 5 is electrically contacted via the connection lines 6 and connected to the electronics 4. In other embodiments, the electronics 4 can also be arranged separately from the measuring insert 3 and protective tube 2. Also, the temperature sensor 5 does not necessarily need to be a resistive element, or the number of connecting lines 6 used need not necessarily be two. Rather, a different number of connecting lines 6 can be used depending on the measuring principle applied.

To improve thermal contacting a spring element 7 is frequently arranged inside the protective tube 2 and/or a paste 8 is provided in the inner volume V of the thermowell 2. However, that way only insufficient mechanical stability and thermal contacting is achieved. Typically, air gaps between an inner wall of the thermowell 2 and an outer wall of the measuring insert 3 are not sufficiently minimized. This results in higher response times of the thermometer 3, less mechanical stability and a certain sensitivity towards vibrations.

Figure 2A:
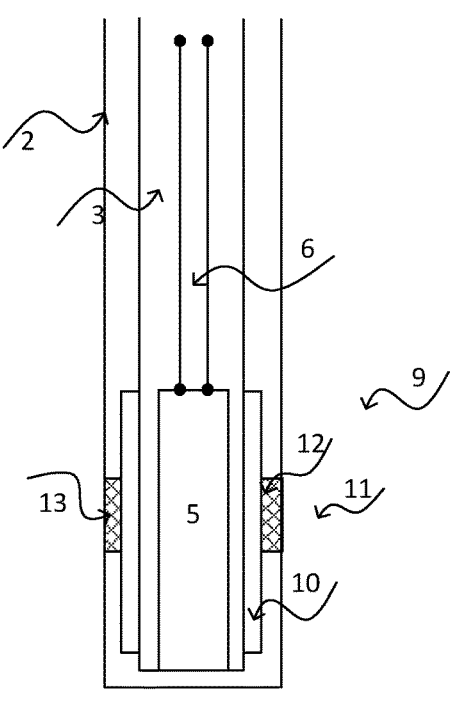
FIGS. 2a and 2b show embodiments of a coupling adapter with a coupling element comprising an elastic and/or deformable element in the form of a foam according to the present disclosure.
Figure 2B:
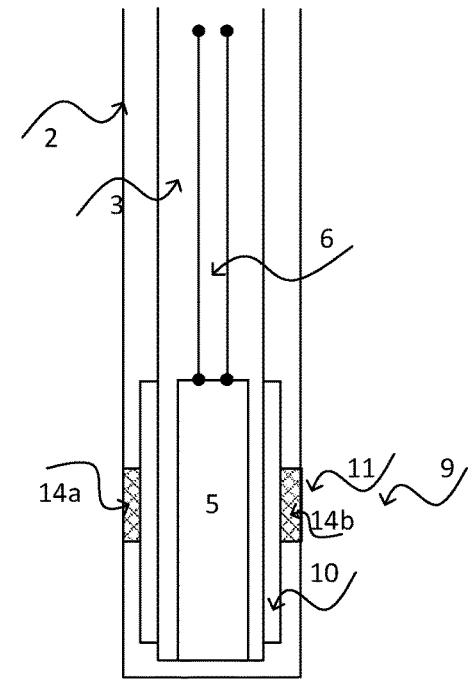

The present disclosure addresses these problems by providing a coupling adapter 9 comprising a base body 10 and a coupling element 11. Exemplary embodiments of measuring inserts 3 inside a thermowell 2 equipped with a coupling adapter 9 positioned in the end region of the measuring insert 3 in which the temperature sensor 5 is arranged are shown in FIGS. 2a and 2b. The coupling element 11 is embodied and/or dimensioned so as to serve for fixing the measuring insert 3 inside the protective tube 2 when inserted therein. That way, mechanical stability of the thermometer 1 can be improved and furthermore, a sensitivity of the thermometer 1 to mechanical vibrations becomes reduced.

In certain embodiments, the coupling element 11 and/or the base body 10 is/are at least partially composed of a thermally conductive material, e.g., a metal. Such an embodiment results in an improved performance of the thermometer 1. In particular, a response time of the thermometer 1 in response to a change of the temperature T of the medium M is significantly reduced.

In case of the embodiment shown in FIG. 2a, the coupling element 11 comprises at least one at least partially elastic and/or deformable element in the form of, for example, a metallic, foam 12 attached to the base body 10. The coupling element 11 may further comprise a filling material 13 filled into remaining gaps in the foam 12. Alternatively, the elastic and/or deformable element can also be, for example, a metallic, mesh.

In such an embodiment, the base body 10 has an overall cylindrical shape with an internal bore adapted to the dimensions of the measuring insert 3. However, also other embodiments of the base body 10 are feasible and do fall within the present disclosure. For instance, the base body 10 may have varying thickness, different geometries and/or different dimensions from one embodiment relative to another.

As illustrated in FIG. 2b, the coupling element 11 may further also comprise at least two different components 14 serving different purposes, e.g., one rigid component 14a and one elastic component 14b. For example, the coupling element 11 in such that the second elastic component 14b is provided by the elastic and/or deformable element, e.g., a foam or mesh, and the first component 14a, e.g., in the form of a rigid frame.

Examples for preferred materials for the coupling element 11 are stainless steel, copper, brass, aluminum or others.

Figure 3A:
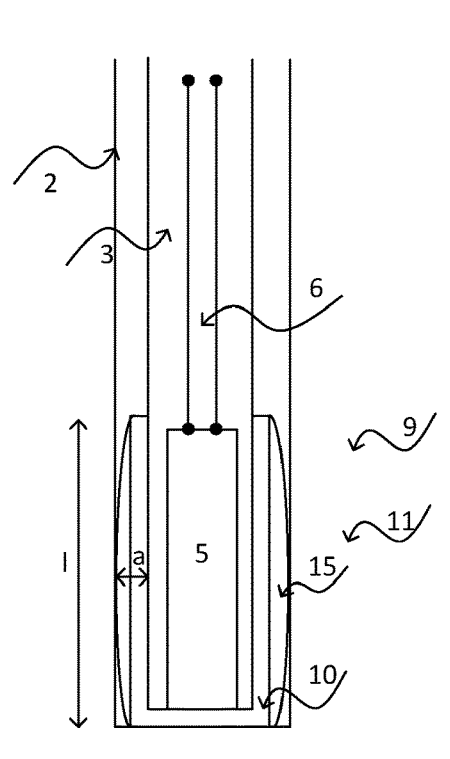
FIGS. 3a and 3b show further embodiments of a coupling adapter with a coupling element comprising an elastic and/or deformable element in the form of a spring element according to the present disclosure.
Figure 3B:
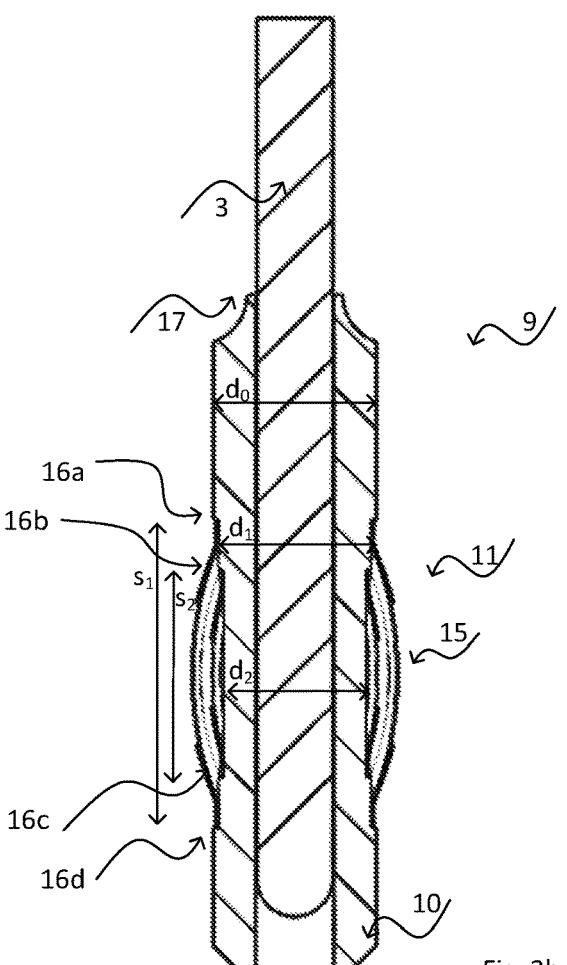

Further embodiments are shown in FIGS. 3a and 3b. In the embodiment of FIG. 3a, the at least partially elastic and/or deformable element is a spring element 15 fastened to the base body 10 by means of a form-fit connection. A spring travel a of the spring element 15 is perpendicular to a longitudinal axis 1 of the measuring insert 3.

In the embodiment of FIG. 3b, the base body 10 also has a cylindrical shape with an internal bore having a bore diameter corresponding to an outer diameter of the measuring insert 3. However, in contrast to the embodiment shown in FIG. 3a, the outer diameter d of the base body 10 varies along its and the longitudinal axis 1 of the measuring insert 3. The outer wall of the base body 10 comprises several shoulders 16a-16d. The diameter do of the base body 10 is further reduced to a first reduced diameter $d_1$ in a first section 51 defined by the shoulders 16a and 16d and further reduced to a second reduced diameter $d_2$ in a second section $s_2$ defined by shoulders 16a and 16d. Spring element 15 is clamped or fastened on the base body 10 in the second section $s_2$ between shoulders 16b and 16c. By providing several sections s with varying diameter d for the base body 10, different spring elements 15 can be provided for the same coupling adapter 9 for different applications and geometries.

It shall be noted that the base body 10 may further comprise fastening means 17 for fastening the base body 10 to the measuring insert 3. In such an embodiment, the fastening means 17 are provided by an end section of the base body 10 with reduced wall thickness serving to establish a force-fit or form-fit connection with the measuring insert 3.

Several embodiments for a coupling adapter 9 including a coupling element 11 comprising a spring element 15 are shown in FIGS. 4a-4c. The spring element 15 shown in FIG. 4a comprises a plurality of outward curved bars 18 and two ring-shaped connection elements 19. The bars 18 are clamped and fastened between the two connecting elements 19 and are evenly distributed around the circumference of the connecting elements 19. The quantity of bars 18 as well as their dimensions, e.g., length and width, can vary from one embodiment relative to another. For instance, in case of the spring element 15 shown in FIG. 4b, the number of bars 18 provided is less as in case of FIG. 4a, but the width of each bar 19 is larger. Moreover, while two connection elements 19 are provided for the embodiment shown in FIG. 4a, the one shown in FIG. 4b comprises one connecting element 19. Another embodiment of a spring element 15 is subject to FIG. 4c. Here, three connection elements 19 are provided, whereas bars 18 are provided in each case between two adjacent connecting elements 19.

Figure 5:
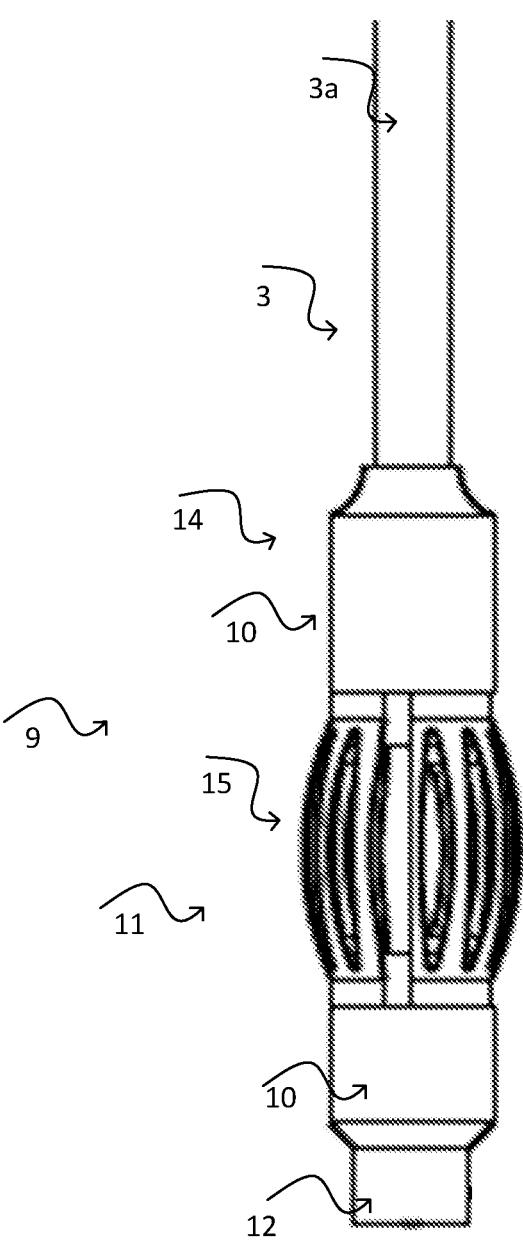
FIG. 5 shows an embodiment with a coupling element comprising a spring element and a mesh according to the present disclosure.

Another embodiment is presented in FIG. 5. The coupling adapter 9 is arranged in the end region of the elongated tube 3a of the measuring insert 3. The coupling element 11 comprises a base body 10 and a spring element 15 similar, as in the embodiment shown in FIG. 3b. Moreover, a mesh 12 is provided at the tip of the elongated tube 3a. That way, the coupling element 11 comprises a mesh 12 and a spring element 15. Alternatively, a metallic foam can be provided instead of the mesh 12.

We claim:

1. A coupling adapter for a measuring insert for determining and/or monitoring a temperature of a medium, wherein the measuring insert comprises a temperature sensor and is configured to be introduced into a protective tube configured to accommodate the measuring insert, the coupling adapter comprising:

a base body having a generally cylindrical shape and including an internal bore having a fixed bore diameter, which corresponds to an outer diameter of the measuring insert; and

a coupling element configured so as to fix the measuring insert inside the protective tube in a state when the measuring insert is introduced into the protective tube, wherein the coupling element is arranged on an outer surface of the base body, wherein the coupling element is at least partially composed of a thermally conductive material and includes a spring element as a first at least partially elastically deformable element, and wherein the base body includes at least one section in which an outer diameter of the base body is reduced and the spring element is arranged.

2. The coupling adapter of claim 1, wherein the base body is at least partially composed of a thermally conductive material.

3. The coupling adapter of claim 1, wherein the spring element is configured such that a spring travel of the spring element is perpendicular to a longitudinal axis of the measuring insert.

4. The coupling adapter of claim 1, wherein the spring element comprises a plurality of outward curved bars and at least one ring-shaped connection element to which the plurality of curved bars is connected, wherein the plurality of curved bars is evenly distributed around a circumference of the connection element.

5. The coupling adapter of claim 1, wherein the coupling element is connected to the base body by a force-fit and/or form-fit connection.

6. The coupling adapter of claim 1, wherein the at least one section of the base body includes a first section and a second section, each having reduced outer diameters, wherein a first outer diameter in the first section is different from a second outer diameter in the second section, and wherein the coupling element is arranged either in the first section or in the second section.

7. The coupling adapter of claim 1, wherein the coupling element includes a mesh or a foam as a second at least partially elastically deformable element.

8. The coupling adapter of claim 7, wherein the spring element, the mesh and/or the foam are metallic.

9. The coupling adapter of claim 1, wherein the coupling element further comprises a filling material distributed about the spring element to fill gaps in the coupling element, wherein the filling material is a powder or a paste.

10. The coupling adapter of claim 9, wherein the coupling element comprises a graphite powder.

11. An apparatus for determining and/or monitoring a temperature of a medium in a vessel or pipe, the apparatus comprising:

a measuring insert comprising:

a temperature sensor including a resistive element or a thermocouple; and connection lines adapted to electrically contact the temperature sensor;

a protective tube configured to accommodate the measuring insert; and the coupling adapter according to claim 1.

* * * * *